March 16, 1937. A. MOORHOUSE 2,073,705
CLUTCH MECHANISM
Filed July 22, 1932
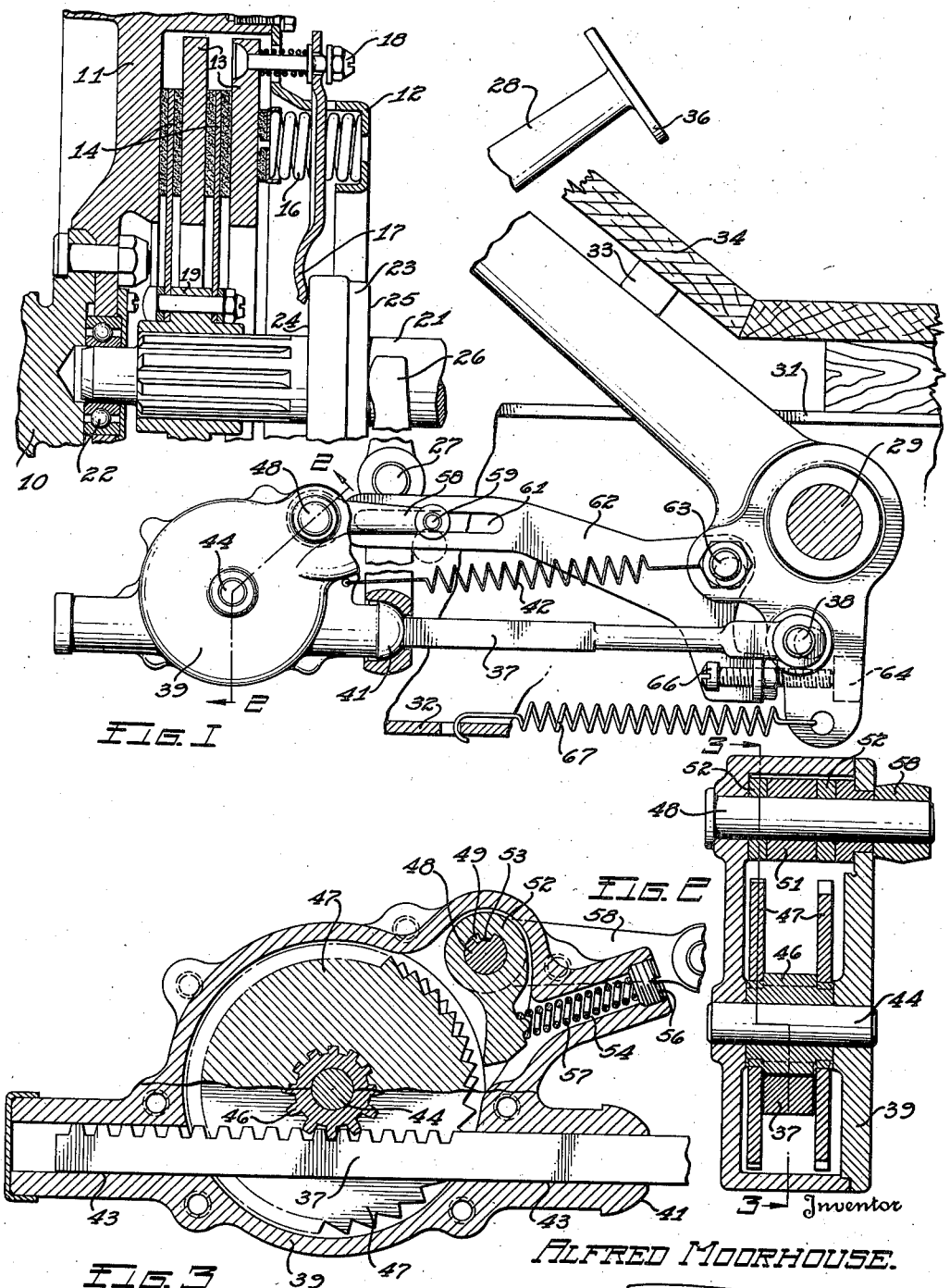
Inventor
ALFRED MOORHOUSE.
By Milton Tibbets
Attorney Patented Mar. 16, 1937

2,073,705

UNITED STATES PATENT OFFICE 2,073,705

CLUTCH MECHANISM

Alfred Moorhouse, Detroit, Mich., assignor to Packard Motor Car Company, Detroit, Mich., a corporation of Michigan Application July 22, 1932, Serial No. 623,982

8 Claims. (Cl. 192—111)

This invention relates to motor vehicles and more particularly to means for adjusting the vehicle control mechanisms.

There have previously been proposed various means for automatically maintaining the proper relationship between the brake or clutch operating members and the mechanism of the brake or clutch but most of these mechanisms have been of the type which permit movement in only one direction. Modern motor vehicles using motors mounted on yieldable means have developed a sensitivity of adjustment, particularly for the clutch and brake mechanism which necessitates a further refinement of the adjusting mechanism.

There have also been proposed various types of slack take-up mechanisms in which the parts were exposed to the action of the elements and some have even partially enclosed some of the parts, but I have found that it is necessary wholly to enclose the clearance adjusting parts forming the operating connection between the operator's lever and the operated mechanism in order that dirt and other foreign substances will not affect the performance of the system.

One of the objects of this invention is to provide a clearance adjusting mechanism which will permit a connection between an operating member having a fixed range of movement and an operated member having a variable range of movement, said connections being established only when the parts are to be engaged in operative relationship and said parts, when not operating, being free to move in opposite directions relative to each other.

Another object of the invention is to provide a two-way clearance adjusting mechanism which will positively engage and disengage.

It is a further object of this invention to provide a sealed clearance adjusting mechanism.

Other objects of the invention will appear from the following description taken in connection with the drawing, which forms a part of this specification, and in which:

Fig. 1 is a side view of a portion of a motor vehicle having parts thereof broken away to show the invention as applied;

Fig. 2 is an enlarged sectional view taken on the line 2—2 of Fig. 1; and

Fig. 3 is a section on the line 3—3 of Fig. 2.

Referring to the drawing, 10 illustrates a motor crankshaft, 11 a motor fly wheel, 12 a clutch cover plate mounted on the fly wheel in the well-known manner. 13 are clutch pressure or driving plates and 14 are driven plates having linings thereon which frictionally engage the fly wheel and the clutch driving plates under the action of the clutch springs 16. Clutch operating fingers 17, through suitable connecting studs 18, serve to disengage the clutch driving plates 13 by compressing the springs 16 against the cover plate 12 of the clutch.

The driven clutch plates 14 are suitably mounted on a hub member 19 splined on the clutch shaft 21 which latter is piloted by a suitable bearing 22 supported in the rear portion of the crankshaft or the hub of the fly wheel. The clutch shaft also is supported by the transmission case in a manner not shown. Slidably mounted on the clutch shaft 21 is a clutch throw-out bearing 23 the front face 24 of which engages the clutch throw-out fingers 17 and the rear or inner face 25 of which is engaged by an actuator or yoke member 26 mounted on a pivot 27 in the side of a bell housing, not shown.

The clutch is shown in engaged position and is disengaged by forward movement of the thrust bearing. Such movement pivots the clutch fingers 17 on the casing 12 and releases the engaging pressure between the pressure and driven clutch plates. When the sleeve is released, the clutch springs 16 serve to engage the clutch and move the thrust bearing rearwardly to its original position. It will be understood that as the clutch wears, the clutch engaged position of the thrust bearing 23 will move to the rear axially of the clutch shaft and as the clutch plates warm up the resulting axial expansion will tend to move the clutch engaged position of the clutch thrust bearing forwardly. If the motor is supported in the vehicle frame by means of a yieldable connection, as is well known in the art, a further possibility for movement of the throw-out bearing occurs due to the yieldability of such a mounting. For all these reasons, therefore, it is clearly obvious that the range of movement of the clutch throw-out bearing is variable even though its total movement on any one disengaging stroke is generally a constant one. Even in the case of the brake pedal and the brake operating cam at the brake, one finds the pedal having a fairly constant range of movement and the cam a variable range due to warming or cooling of the drum.

The operating mechanism for the variable range operated yoke 26 comprises an operating member such as a clutch pedal 28 which is shown as mounted on a pivot 29 which may be mounted on the web of the frame side rail, not shown, between the upper flange 31 and the lower flange 32. When the motor is yieldably connected to the frame, it is quite common for the clutch pedal mounting to be separate from the motor.

The clutch pedal operating range varies between an upper point where the pedal strikes a stop 33 fixed to the vehicle floor boards 34 and a lower point where the clutch pedal pad 36 strikes the floor board, and its range is thus relatively fixed.

It is, of course, desirable that the full range of movement of the clutch pedal be used each time, but because the pedal is connected up to an operated member whose range of movement varies with the position of the clutch throw-out bearing, some slack-adjusting means is necessary.

Because the clutch pedal is usually separately mounted from the motor, it would, if it were fixedly connected to the yoke 26, move continually with motor movement. This is undesirable and consequently in addition to a slack-adjusting function the connecting means should also be arranged to disconnect the operating member 28 when the clutch is in engaged position and should automatically connect the members when clutch disengagement is desired.

The mechanism for accomplishing these two functions will now be described. It comprises a rack member 37 shown as being pivotally associated, as at 38, with the operating member 28, and a connecting casing member 39 shown as being associated with the yoke 26 and connecting said yoke to the rack member by means of a spherical joint 41.

A tension spring 42 is hooked between the casing and the clutch operating member 28 and serves the purpose of keeping the casing 39 continually urged towards the operating member. This spring is not sufficiently strong to cause movement of the operated member 26 about its pivot 27 and thereby produce any tendency whatever towards a slipping of the clutch. It serves merely to retain the parts in assembled relationship. The casing is formed with suitable bearings 43 which serve to locate the rack member 37.

A shaft 44 is mounted in the walls of the casing adjacent the rack, and a gear 46 thereon engages with the rack. Suitably splined to the ends of the gear 46 and straddling the rack member 37 is a pair of ratchet discs 47 with relatively large tooth spacings but with their teeth alternately arranged. The purpose of this alternate arrangement will be evident later on.

Within the casing, and outside the limits of the ratchet discs 47, is a pivot 48 with a longitudinal groove 49 therein. Mounted on said pivot is a spacer member 51 and between the spacer member and the walls of the casing is a pair of pawl members 52 each having a centrally projecting lip 53 thereon engaging the groove 49. These lips 53 are of a less circumferential length than the groove 49. The purpose of this difference in length will be evident later on.

Mounted within the casing are suitable recesses 54 closed by plugs 56. Suitable springs 57 are located within these recesses and tend to cause an engagement between the pawls 52 and the ratchet discs 47. The ratchet discs and the pawls are so arranged with respect to the rack, the clutch operating member, and the clutch operated member that a clutch operating force applied to the operating member is resisted by the engagement of the pawls with the ratchet discs.

The pivot 48 projects through the wall of the casing and has suitably fixed thereto an operating arm 58 with a pin 59 thereon which engages in a lost-motion slot 61 formed on a bell crank member 62 which latter is pivotally associated with the operating member 28 as at 63. Suitable stop means 64, integral with the operating member 28, engage an adjusting bolt 66 mounted on one arm of the bell crank member 62. Serving to keep the abutment 64 in contact with the adjustable stop bolt 66 and also serving to keep the clutch operating member 28 against the abutment 33 on the floor board 34 is a suitable spring 67 which is shown as being attached to the lower flange 32 of the frame side rail.

The operation of the above described mechanism is as follows: Initial counter-clockwise rotation of the clutch operating member 28 about its pivot 29 serves to move the abutment 64 away from the stop 66 and moves the pivot 63 and the bell crank 62 in a downward direction thereby permitting springs 57 in the casing to accomplish a clockwise rotation of the pivot 48 due to the fact that the resistance to such rotation through the arm 58 and the pin 59 has been eliminated as a result of the downward movement of the bell crank 62. Such clockwise rotation brings about an engagement of one of the pawls 52 with one of the ratchet discs 47. Due to the fact that the teeth of the ratchet discs alternate, only one of these will be engaged at a time, but due to the fact that there are, relatively speaking, so few teeth on the discs, these teeth may be made quite deep and thereby accomplish a secure pawl engagement. It is now evident that the lost-motion connection between the pawl 52 and the groove 49 on the pivot 48 permits relative movement between the bell crank 62 and arm 58 assembly and the engaged pawl without the possibility of such movement, after pawl engagement, having the tendency to strain the bell crank by transmitting any force back through it in case the arm 58 should, by such relative movement, be moved further down than the dotted position would indicate.

At the time of pawl engagement, the pivots 38, 59, and 63 have been moved to the dotted positions shown, adjacent the full line positions, and further counter-clockwise rotation of the operating member 28 now begins to result in clutch disengaging movement due to the fact that the rack 37 is now fixedly engaged by the gear 46 and a clutch disengaging force is then transmitted from the operating member to the rack, from the rack to the casing through the pin 44, and from the casing to the operated member 26 through the spherical joint 41. Further movement thus disengages the clutch by moving the clutch throw-out bearing 23 in the manner previously described.

When the clutch is to be engaged the operator releases the pressure on the pedal, and the clutch springs 16 and the clutch pedal retracting spring 67 are free to operate, clutch springs 16 accomplishing clutch engagement and a return of the operated yoke 26 to the position shown in Fig. 1. This pushes the casing 39 to the left, rotates the operating member 28 in a clockwise direction about its pivot 29 bringing the abutment 64 into contact with the adjusting bolt on the bell crank 62 and thereby raise the slot 61 causing a rotation of the pivot 48 in a counter-clockwise direction thus disengaging the pawl from the ratchet disc. At the instant of this separation the casing 39 is then freed from the rack 37 and one of two situations may arise.

The first of these situations may occur if we assume that the clutch facings have become worn. In this case, the clutch operating member 28 will be stopped by its abutment 33 prior to the cessation of movement of the operated member 26 and the casing 39. When this situation arises, the operated member 26, being pushed further in a clockwise direction by the springs 16, is then free to push the casing 39 to the left until the clutch is fully engaged, such movement resulting in rotation of the gear 46 on the rack 37.

The second of the two situations may arise if we consider the clutch facings, not as being worn, but as having become heated due to slippage of the clutch, for example. This results in clutch engagement prior to the clutch pedal's coming into contact with its abutment 33. Under this condition, the spherical joint 41 reaches a fixed position, the spring 67 then pushing the rack to the left and rotating the clutch operating pedal in a clockwise direction about its pivot 29 until it comes in contact with its abutment 33.

I have thus described a sealed connecting mechanism between an operating member having a fixed range and an operated member having a variable range which positively disconnects the members when the clutch is engaged and which positively connects them again in operative relationship upon initial clutch disengaging movement of the operating member.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In combination, a clutch, means to disengage said clutch including a movable element, the range of movement of said element varying in accordance with clutch wear, and means to move said element including a gear and rack mechanism, said gear and rack being relatively fixed during clutch releasing movement of said element and free to move relatively in opposite directions when said element is in position to allow clutch engagement.

2. A movable operating member having a fixed range, a movable operated member having a variable range, and a take-up mechanism for connecting said members in operative relationship comprising rack means associated with said operating member, casing means associated with said operated member, mechanism associated with said rack and freely movable in opposite directions along said rack when said members are not operatively engaged, and pivoted means associated with said operating member and lying partly within said casing, said pivoted means being responsive to initial movement of said operating member to fixedly engage said mechanism with said rack and thereby connect said members in operative relationship.

3. A movable operating member having a fixed range, a movable operated member having a variable range, and a take-up mechanism for connecting said members in operative relationship comprising rack means associated with said operating member, casing means associated with said operated member, mechanism associated with said rack and freely movable in opposite directions along said rack when said members are not operatively engaged, and lost-motion means associated with said operating member and lying partly within said casing, said lost-motion means being responsive to initial movement of said operating member to fixedly engage said mechanism with said rack and thereby connect said members in operative relationship.

4. In a clutch operating mechanism, a yoke, an operating member, and clearance adjusting mechanism connecting said member and said yoke, said mechanism including an element rockably associated with the yoke for actuating the same, a pawl and ratchet device associated with the rockable element, a pawl disengaging means associated with said member, and lost-motion means between said pawl and said disengaging means.

5. In a clutch operating mechanism, the combination of an operated member having a variable range of movement, and means for actuating said member including a rack and gear mechanism, and means for fixing said rack and gear during releasing movement of said operated element and releasing said rack and gear from fixed relation when said operated member is in position to allow clutch engagement.

6. In a clutch having a pivoted operating member with a fixed range of movement and a pivoted operated member with a variable range of movement, connecting means between the members comprising a housing rockably engaging the operated member, a gear mounted within the housing, a rack member extending into the housing and engaging the gear, said rack member being pivoted to the actuating member, pawl and ratchet means in the housing in operative relation with the gear, and lost motion mechanism between the housing and the operating member, said lost motion mechanism controlling the relation of the pawl and ratchet mechanism.

7. In a clutch having a pivoted operating member with a fixed range of movement and a pivoted operated member with a variable range of movement, connecting means between the members comprising a housing rockably engaging the operated member, a gear mounted within the housing, a rack member extending into the housing and engaging the gear, said rack member being pivoted to the operating member, ratchet means in the housing secured to rotate with the gear, pawl means within the housing adapted to engage the ratchet means, a shaft on which the pawl means is fixed, a lever for rocking said pawl means, another lever pivoted to the actuating member and having a slot therein, and a connection extending through the slot and fixed to said lever, the movement of said actuating member operatively moving the rack and the slotted lever, the movement of the slotted lever allowing the pawl shaft to rock and engage the pawl and ratchet means.

8. In a clutch operating mechanism, an operating member; an operated member; and means connecting said members comprising a rotatable member, an axially movable member directly engaging said rotatable member in driving relation, and a non-rotatably mounted casing completely enclosing said rotatable member and surrounding one end of said axially movable member, said casing being pivotally mounted on said operated member.

ALFRED MOORHOUSE.